(12) United States Patent
Cho

(10) Patent No.: US 9,056,683 B2
(45) Date of Patent: Jun. 16, 2015

(54) SEAT STRUCTURE OF AIRPLANE

(76) Inventor: Hang Min Cho, Paju-si (KR)

( * ) Notice: Subject to any disclaimer, the term of this patent is extended or adjusted under 35 U.S.C. 154(b) by 179 days.

(21) Appl. No.: 13/823,947

(22) PCT Filed: Nov. 17, 2011

(86) PCT No.: PCT/KR2011/008812
§ 371 (c)(1),
(2), (4) Date: Aug. 23, 2013

(87) PCT Pub. No.: WO2012/067452
PCT Pub. Date: May 24, 2012

(65) Prior Publication Data
US 2013/0320139 A1  Dec. 5, 2013

(30) Foreign Application Priority Data

Nov. 18, 2010 (KR) .................. 10-2010-0114730
Nov. 29, 2010 (KR) .................. 10-2010-0120043
Dec. 2, 2010 (KR) .................. 10-2010-0121778
Mar. 9, 2011 (KR) .................. 10-2011-0020786

(51) Int. Cl.
B64D 11/06 (2006.01)

(52) U.S. Cl.
CPC ............ *B64D 11/06* (2013.01); *B64D 11/0601* (2014.12); *B64D 11/0641* (2014.12)

(58) Field of Classification Search
CPC ........... B64D 11/00; B64D 2011/0076; B64D 11/0601; B64D 11/0641; A47C 7/62
USPC ................. 5/9.1; 297/188.01, 411.2, 62; 244/118.5, 118.6
See application file for complete search history.

(56) References Cited

U.S. PATENT DOCUMENTS

| | | | | |
|---|---|---|---|---|
| 964,540 A * | 7/1910 | Niemeyer et al. | ............. | 105/322 |
| 1,995,416 A * | 3/1935 | Carcanagues | ................. | 105/322 |
| 2,124,003 A * | 7/1938 | Helwig et al. | ............. | 244/118.6 |
| 2,550,599 A * | 4/1951 | Reed | ................. | 5/9.1 |
| 2,891,255 A * | 6/1959 | Simmons | .......................... | 5/9.1 |
| 3,311,932 A * | 4/1967 | Ahola | ................. | 5/9.1 |
| 4,044,410 A * | 8/1977 | Klingler | .......................... | 5/9.1 |
| 4,051,564 A * | 10/1977 | Gudish | ................. | 5/9.1 |
| 4,555,821 A * | 12/1985 | Page | ................. | 5/9.1 |
| 4,922,561 A * | 5/1990 | Williams | .......................... | 5/9.1 |
| 5,984,415 A * | 11/1999 | Schumacher et al. | ..... | 297/411.2 |
| 2009/0302156 A1* | 12/2009 | Saint-Jalmes et al. | ..... | 244/118.6 |
| 2010/0140010 A1 | 6/2010 | Hollenbeck et al. | | |
| 2010/0219291 A1* | 9/2010 | Guering | .................... | 244/118.5 |
| 2012/0200125 A1* | 8/2012 | Achilles | .................. | 297/188.01 |
| 2013/0054279 A1* | 2/2013 | Sharp et al. | ....................... | 705/5 |
| 2014/0246886 A1* | 9/2014 | Savard et al. | ................... | 297/62 |

FOREIGN PATENT DOCUMENTS

| | | |
|---|---|---|
| CN | 1461272 A | 12/2003 |
| EP | 0516575 A1 | 12/1992 |
| FR | 2163250 A5 | 7/1973 |

(Continued)

*Primary Examiner* — Valentina Xavier
(74) *Attorney, Agent, or Firm* — East West Law Group; Heedong Chae

(57) ABSTRACT

An airplane seat structure includes: a body frame including a plurality of seat boards and seat backs which are arranged in the longitudinal direction at predetermined intervals in a space having a small seat pitch and provide two or more seats in the traverse direction; a connection plate which is bendably connected to a front end of the body frame or the seat board and is horizontally spread to another body frame adjacent frontward to the body frame; a first bed space which is formed over the seat board and the horizontally-spread connection plate; and a second bed space which is formed below the seat board and the horizontally-spread connection plate or formed below the horizontally-spread connection plate and a seat board of the frontward adjacent body frame.

19 Claims, 13 Drawing Sheets

(56) References Cited

FOREIGN PATENT DOCUMENTS

| FR | 2692122 A1 | 12/1993 |
| FR | 2753170 A1 | 3/1998 |
| JP | 2001-087074 | 4/2001 |
| JP | 2006-282132 | 10/2006 |
| KR | 10-2000-0075486 | 12/2000 |

* cited by examiner (a)

(b)

SEAT STRUCTURE OF AIRPLANE

BACKGROUND OF THE INVENTION

1. Field of the Invention

The present invention relates to a seat structure of an airplane, and more particularly, to an airplane seat structure which is capable of enjoying a comfortable air travel without any inconvenience such as leg numbness or the like even for long flight by modifying a narrow (or short-pitch) seat such as an economy class or a separate cabin-like family box in order to allow a passenger to straightly lie, such as in a bed.

2. Description of the Related Art

An airplane is an object which uses a lift force of a fixed wing to fly in air with persons and things loaded into it.

Such an airplane may be divided into several types depending on its use, propulsion modes, wing forms and so on.

An airplane mentioned in the present invention refers to a passenger airplane which may be sorted according to its use.

A passenger airplane is intended to carry people and possesses 20 to 800 seats. For reference, a passenger airplane having less than 20 seats is called a commuter or an air tax.

Seats in a passenger airplane may be generally classified into a first class, a business class and an economy class depending on a seat area and a service grade.

The first class, which is also called a sleeper seat, serves to allow a passenger to lie on a completely unfolded seat and the business class serves to allow a passenger to stretch his/her legs, taking a comfortable posture, in a long-pitch seat although a passenger cannot lie on the seat unlike the first class.

In contrast, the economy class forces a passenger not to stretch his/her legs, taking an uncomfortable posture, in a short-pitch seat during the whole flight.

However, most of passengers use the economy class since it is more expensive than the first class and the business class.

Some passengers in the economy class may experience an economy class syndrome such as leg numbness or the like due to an uncomfortable posture taken in a narrow space for a long time.

An economy class syndrome refers to a disease causing a pulmonary embolism due to a thrombus or a blood clot formed in a leg vein while a passenger is sitting for a long time on a short-pitch seat on which the passenger cannot stretch his/her legs.

Accordingly, there is a need for an airplane seat structure to prevent a passenger from undergoing a disease such as an economy class syndrome and, particularly, to allow a family in a cabin-like family box to enjoy a comfortable air travel in a long time comfortable posture.

SUMMARY OF THE INVENTION

Accordingly, it is an object of the present invention to provide an airplane seat structure which is capable of modifying airplane seats in order to allow passengers to straightly lie, such as in a bed.

It is another object of the present invention to provide an airplane seat structure which is capable of providing a separate family bed space by modifying seats in a separate cabin-like family box into a bed.

It is still another object of the present invention to provide an airplane seat structure which allows all of the same number of persons as the number of seats to lie.

To achieve the above objects (according to an aspect of the invention, there is provided an airplane seat structure including: a body frame including a plurality of seat boards and seat backs which are arranged in the longitudinal direction at predetermined intervals in a space having a small seat pitch and provide two or more seats in the traverse direction; a connection plate which is bendably connected to a front end of the body frame or the seat board and is horizontally spread to another body frame adjacent frontward to the body frame; a first bed space which is formed over the seat board and the horizontally-spread connection plate; and a second bed space which is formed below the seat board and the horizontally-spread connection plate or formed below the horizontally-spread connection plate and a seat board of the frontward adjacent body frame, wherein the number of seats provided by the seat boards corresponds to the number of persons who can be lay, provided by the first bed space and the second bed space.

Preferably, the body frame is in the form of a cabin including a vertical wall which is vertically formed in a rear end of the seat board and includes the seat back, and a blind wall which is vertically formed adjacent to the vertical wall in both ends of the seat board.

Preferably, the connection plate is bendably connected to each of front ends of the seat boards.

Preferably, the connection plate is bendably integrated with the front end of the body frame with no distinction between the seat boards.

Preferably, the airplane seat structure further includes an arm rest which is disposed to correspond to both sides of the seat board in the traverse direction, is bendably connected to the seat back, and extends horizontally to the front side of the seat back or is withdrawn into the seat back.

Preferably, the airplane seat structure further includes a hydraulic cylinder or a bending device which actuates the connection plate to be horizontally spread or bent downward.

Preferably, the airplane seat structure further includes a connection plate braking sensor which is mounted on a distal end of the connection plate, detects an emergency situation such as a finger being caught between the distal end of the connection plate and the adjacent body frame when the connection plate is horizontally spread, and stops the spreading operation of the connection plate or bends the connection plate downward Preferably, the airplane seat structure further includes a connection plate safety device for fixing the distal end of the horizontally spread connection plate to the frontward adjacent body frame, and a safety device switch for actuating the connection plate safety device.

Preferably, the airplane seat structure further includes: a regular position sensor for detecting a regular position of the distal end of the horizontally spread connection plate connected to the frontward adjacent body frame; and an alarm for alerting any detected separation from the regular position.

Preferably, the airplane seat structure further includes an emergency beeper included in the interior of the second bed space for alarming an emergent situation.

Preferably, the airplane seat structure further includes a foot rest which is folded to the connection plate with its distal end bendably connected to the connection plate or is spread vertically or substantially vertically from the connection plate.

Preferably, the airplane seat structure further includes a guide frame connecting the blind wall and the top of the frontward adjacent body frame, and a cloth or a sliding door which is moved along the guide frame and blocks between the blind wall and the frontward adjacent body frame Preferably, the airplane seat structure further includes storage formed in the top rear side of the vertical wall for storing travel necessities.

Preferably, the airplane seat structure further includes a foldable table which is placed in the upper side of the seat board in the rear side of the vertical wall and is foldably connected to the rear side of the vertical wall.

Preferably, the seat board includes a step plate formed in the direction from the seat board to the seat floor.

Preferably, the airplane seat structure further includes a safety belt with the connection plate excluded from the airplane seat structure.

Preferably, the body frame is provided with a foldable bed.

According to another aspect of the invention, there is provided an airplane seat structure including: a pair of body frames, each including a plurality of seat boards and seat backs which are arranged in the longitudinal direction at predetermined intervals in a space having a small seat pitch and provide two or more seats in the traverse direction; a connection plate which is bendably connected to a front end of one of the body frames or the seat board and is horizontally spread to the other opposing body frame; a first bed space which is formed over the seat board and the horizontally-spread connection plate; and a second bed space which is formed below the seat board and the horizontally-spread connection plate, wherein the number of seats provided by the seat boards corresponds to the number of persons who can be lay, provided by the first bed space and the second bed space.

Preferably, the airplane seat structure further includes blind plates connecting the pair of body frames and a sliding door which is formed between the blind plates.

Preferably, a foot rest on which feet can be put is further included in a lower part of the connection plate.

The airplane seat structure according to the present invention is capable of modifying short-pitch seats in order to allow passengers to lie and enjoy a long time comfortable air travel. This may result in prevention of an economy class syndrome such as leg numbness or the like which may be caused due to an uncomfortable posture during long distance flight.

In addition, by adjusting a ratio of sitting to lying seats, all members in the assigned seats can sit or lie, or some can sit and the others can lie.

In addition, by modifying a separate cabin-like family box into a bed, it is possible to secure a separate family bed space in which family members can lie and enjoy a comfortable air travel.

In addition, since a horizontally spread connection plate is fixed through a connection plate safety device and a separation from a regular position such as connection plate drooping is detected by a regular position sensor, prompt measure against such a separation is possible. Accordingly, passengers can sleep in relief on spread connection plates.

In addition, a space which is surrounded by a blind wall and partitioned by a cloth or a sliding door for sleeping allows passengers to put in a comfortable sleep.

In addition, an emergency situation can be alerted by means of an emergency beeper in a bed space defined below a seat board.

In addition, since a bed space defined below a tall seat board has a high ceiling, a marginal space can be provided and feet which do not touch the floor can be put on a foot rest in comfort.

In addition, a foldable table can be used to facilitate meal and readings in a sitting posture.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

Hereinafter, preferred embodiments of an airplane seat structure according to the present invention will be described in detail with reference to the drawings.

The airplane seat structure of the present invention may be in the form of a typical seat such as an economy class or a business class, or more preferably, in the form of a cabin providing a separate comfortable family box. Therefore, the following description will be focused on the cabin-like family box; however, it will be apparent to those skilled in the art that this description can be also applied to typical seats adopted for an economy class or a business class.

Accordingly, the airplane seat structure of the present invention involves modifying a short-pitch seat space in which a passenger cannot lie, particularly, a separate cabin-like family box separated from typical seat arrangement, in order to allow the passenger to lie such as in a bed.

Figure 1:
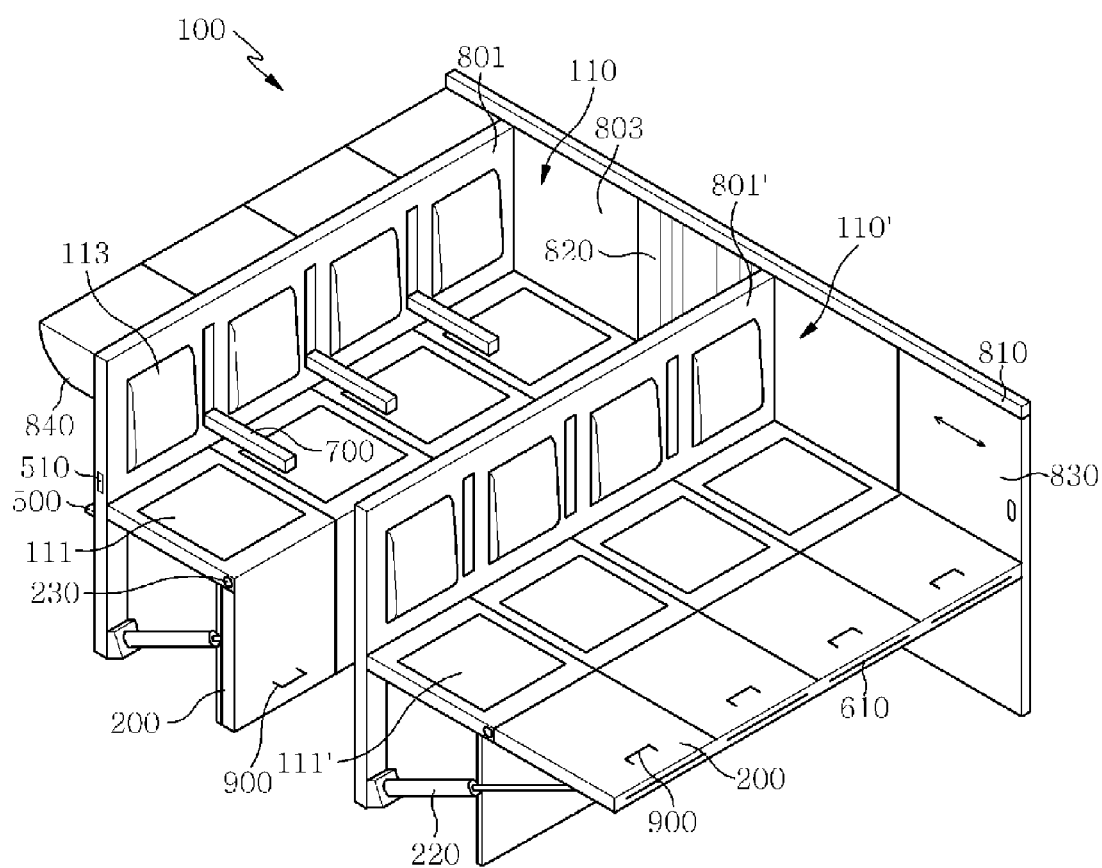
FIG. 1 is a perspective view showing a cabin style seat structure in an airplane according to a preferred embodiment of the invention.
Figure 2:
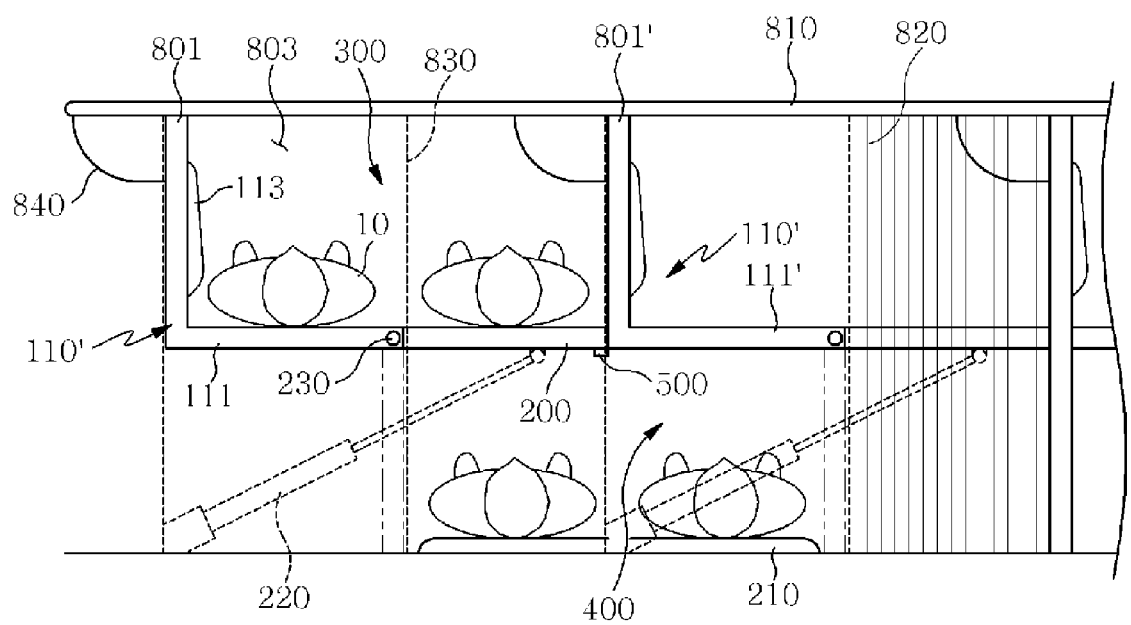
FIG. 2 is a side view showing a bed space in a cabin style airplane seat structure according to a preferred embodiment of the invention.
Figure 3:
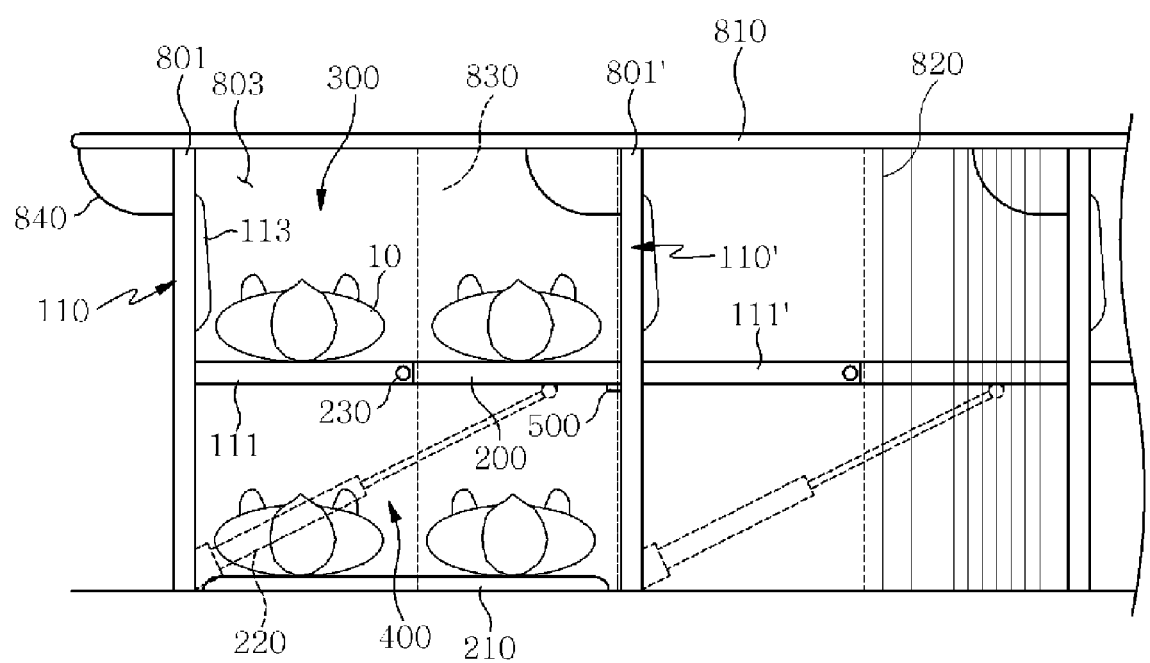
FIG. 3 is a side view showing another bed space in a cabin style airplane seat structure according to a preferred embodiment of the invention.

To this end, as shown in FIGS. 1 to 3, a cabin style seat structure of an airplane according to an embodiment of the invention includes a body frame 110 including a plurality of seat boards and seat-backs which are arranged in the longitudinal direction at predetermined intervals in a space having a small seat pitch and provide two or more seats in the traverse direction, a connection plate 200 which is bendably connected to a front end of the body frame 110 or the seat board 111 and is horizontally spread to another body frame 110' adjacent frontward to the body frame 110, a first bed space 300 which is formed over the seat board 111 and the horizontally-spread connection plate 200, and a second bed space 400 which is formed below the seat board 111 and the horizontally-spread connection plate 200 or formed below the horizontally-spread connection plate 200 and a seat board 111' of the frontward adjacent body frame 110'.

The body frame 110 is preferably in the form of a cabin and includes a vertical wall 801 which is vertically formed in a rear end of the seat board 111 and includes the seat back, and a blind wall 803 which is vertically formed adjacent to the vertical wall 801 in both ends of the seat board 111.

Accordingly, the body frame 110 forms a cabin-like external frame by the vertical wall 801 and the blind wall 803 and forms a cabin type family box 100 including the seat board 111 horizontally extending inward from the vertical wall 801 and the seat back 113 provided in the inner surface of the vertical wall 801 in the upward direction of the seat board 111.

The cabin type family box 100 according to a preferred embodiment of the present invention usually takes a chair shape with the connection plate 200 downward bent and provides the first bed space and the second bed space with the connection plate 200 horizontally spread at a bed space need, taking a double-deck bed type to allow users to be straightly lie down along the traverse direction of the continuous seat boards 111.

The number of seats provided by the seat boards 111 corresponds to the number of persons who can be lay, provided by the first bed space 300 and the second bed space 400.

That is, if four seat boards 111 on which four persons can sit are provided in one of a plurality of body frames 110 placed in the longitudinal direction, seats on which all of the four persons can sit or lie can be provided, such as one on the four seat boards 111, one on the floor below the seat boards ill, one on the horizontally spread connection plate 200 and one on the floor below the connection plate 200.

The second bed space 400 can be modified as shown in FIG. 2 or 3.

Accordingly, the second bed space 400 can be provided in such a manner that some of passengers 10 having seats in the same body frame 110 are located below the seat board 111' of the frontward adjacent body frame 100', as shown in FIG. 2 or all of the passengers 10 having the same body frame 110 are located in a space occupied by the same body frame 110, as shown in FIG. 3.

However, for the former, as some of the passengers secede into the space of another body frame 100', it is preferable to provide the second bed space 400 so that the whole family is located in the space of the same body frame 110.

In more detail, the cabin-like body frame 110 provides a separate family interior space in which a plurality of seat boards 111 is continuously formed in the traverse direction, the vertical wall 801 is built up in the rear side and the blind wall 803 is built up in the lateral side.

In this case, the inner side of the vertical wall 801 may include seat backs 113 located in the upper rear end of the seat boards 111 in association with the plurality of seat boards 111 and the inclination angle of the seat backs 113 relative to the erected vertical wall 801 may be changed.

A mat 210 may be further included in the floor of the second bed space.

Accordingly, some of the passengers 10 having seats assigned in the same cabin-like body frame 110 can lie on the seat boards 111 and the connection plate 200 and the others can lie on the mat 201.

In addition, preferably, the second bed space further includes a guide frame 800 connecting tops between the cabin-like body frame 110 and another frontward adjacent cabin-like body frame 110', and a cloth 820 or a sliding door 830 which is moved along the guide frame 800 and blocks between the blind wall 803 and the frontward adjacent cabin-like body frame 110'.

In this case, a fixable sliding door 830 instead of a cloth 820 is more preferable such that the interior of the cabin-like body frame 110 can provide a separate comfortable seat board space for family.

Accordingly, the first bed space 300 and/or the second bed space 400 may be blocked from the outside by being surrounded by the vertical wall 801, the blind wall 803 and the sliding door 830 so that the family passengers 10 can lie and sleep in comfort.

In addition, preferably, an emergency beeper (not shown) to alarm an emergent situation may be further included in the interior of the second bed space 400.

When the cloth 820 or the sliding door 830 is shut or closed, the second bed space 400 is closed to prevent its internal situation from being observed or recognized, although the top of the first bed space 300 may be opened so that it can be observed by an aircrew or the like.

Accordingly, a passenger located in the second bed space 400 can use the emergency beeper (not shown) to alarm an internal emergent situation or a request.

In addition, preferably, an arm rest 700 may be further included, which is disposed to correspond to both sides of the seat board 111 in the traverse direction, is bendably connected to the inner side of the seat back 113 or the vertical wall 801, and extends horizontally to the front side of the seat back 113 or the vertical wall 801 or is folded into the seat back 113 or the vertical wall 801.

In this case, preferably, the arm rest 700 can be withdrawn into the seat back 113 or the vertical wall 801.

Accordingly, when a passenger sits on a seat board 111, the arm rest 700 is horizontally extended to put his/her arm on the arm rest 700. When the passenger lies on the seat board 111, the arm rest 700 is withdrawn into the seat back 113 or the vertical wall 801 to prevent it from being got in the way.

Next, the connection plate 200 is spread from one cabin-like body frame 110 and its distal end is connected to the frontward adjacent cabin-like body frame 110' (see FIG. 2). Preferably, the connection plate 200 is connected to the front end of the cabin-like body frame 110 or the front end of the seat board 111 by a bendable hinge 230.

Accordingly, the connection plate is usually bent below the seat board 111 and is horizontally spread by being rotated around the hinge 230 when a passenger needs a bed.

In addition, the connection plate 200 is bent for each of front ends of the seat boards 111 or each of front ends of the body frames 110 for different seats.

This allows a connection plate 200 for a required seat to be spread to provide a room to turn in.

For example, in a case where a family of four sit in the cabin-like body frame 110, connection plates 200 of seats for two parents are put in a bent state and connection plates 200 of seats for two children are horizontally spread. That is, the parents can sit while the children can lie.

On the other hand, the connection plates 200 may be integrally formed irrespective of the seat boards 111 for different seats and may be bendably connected to the front ends of the cabin-like body frames 110.

In addition, the connection plates 200 may be extended by a predetermined length to connect one cabin-like body frame 110 and another adjacent cabin-like body frame 110'.

Accordingly, the seat board 111 of the cabin-like body frame 110 is placed to be so high that it can be sufficiently received in a lower part of the body frame 110 with the connection plate 200 extended by the predetermined length.

As a result, a short-legged passenger who sits on the seat board 111 may feel tired easily as his/her foot does not touch the floor.

Accordingly, preferably, a foot rest 900 may be further included, which is folded to the connection plate 200 with its distal end bendably connected to the connection plate 200 or is spread vertically or substantially vertically from the connection plate 200.

That is, a passenger whose foot does not touch the floor can take a comfortable posture by putting the foot on the spread foot rest 900.

In addition, preferably, a hydraulic cylinder 220 or a bending device (not shown) may be further included, which actuates the connection plate 200 to be horizontally spread or bent downward. In this case, the hydraulic cylinder 220 or the bending device (not shown) may be covered to prevent a scratch in use.

Accordingly, the connection plate 200 is horizontally spread or bent downward by switch actuation of the hydraulic cylinder 220 or the bending device (not shown). Preferably, the hydraulic cylinder 220 may be used to keep the connection plate 200 horizontally tight.

In addition, preferably, a connection plate braking sensor 610 may be further included, which is mounted on the distal end of the connection plate 200, detects an emergency situation such as a finger being caught between the distal end of the connection plate 200 and a vertical wall 801' of the adjacent cabin-like body frame 110' when the connection plate 200 is horizontally spread, and stops the spreading operation of the connection plate 200 or bends the connection plate 200 downward.

Accordingly, if the connection plate braking sensor 610 detects that a portion of human body such as a finger or the like is caught between the distal end of the connection plate 200 and the adjacent cabin-like body frame 110' while the connection plate 200 is being automatically spread by the hydraulic cylinder 220, the connection plate 200 is prevented from being horizontally combined with the adjacent cabin-like body frame 110' with the finger or the like caught therebetween by stopping the actuation of the hydraulic cylinder 220 or actuating the hydraulic cylinder 220 reversely for the purpose of protection against accident or injury.

Figure 4:
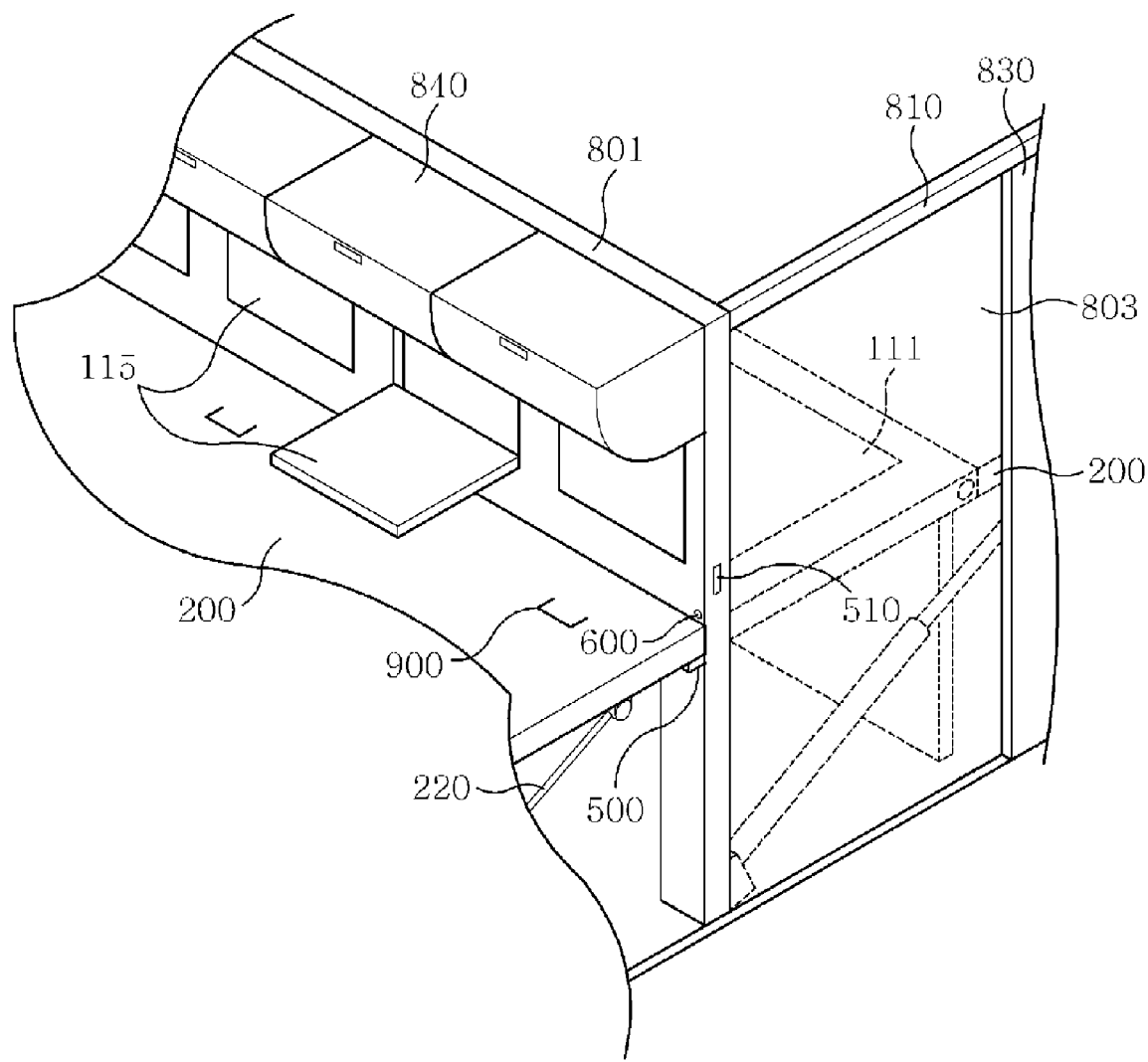
FIG. 4 is a perspective view showing a connection condition of a connection plate in the airplane seat structure of the present invention.

In addition, as shown in FIG. 4, a connection plate safety device 500 for fixing the horizontally spread connection plate 200 to the rear surface of the vertical wall 801 of the cabin-like body frame 110 and a safety device switch 510 for actuating the device 500 may be further included.

The connection plate safety device 500 serves to fix the horizontal connection of the connection plate 200 and may be preferably implemented with a lock which enters and leave from the interior of the vertical wall 801 into the rear side by actuation of the safety device switch 510.

Accordingly, as the connection plate safety device 500 projects from the vertical wall 801 into the rear side to fix the distal end of the horizontally connected connection plate 200, a passenger lying on the connection plate 200 can sleep in relief. In addition, the connection plate safety device 500 is led into the vertical wall 801 in a state where the connection plate 200 is bent downward, such as when a passenger sits, to prevent clothes from being caught by the connection plate safety device 500 or prevent a portion of human body from being scratched.

Moreover, preferably, a regular position sensor 600 for detecting a regular position of the distal end of the connection plate 200 connected to the horizontally spread cabin-like body frame 110' and an alarm (not shown) for alerting any detected separation from the regular position may be further included.

Accordingly, the regular position sensor 600 detects a possibility that the distal end of the connection plate 200 is drooped and its horizontality is crumbled and the passenger 10 lying on the connection plate 200 is informed of such possibility through the alarm (not shown).

This can prevent passengers from falling due to an unexpected bend of the connection plate 200.

In addition, preferably, storage 840 for storing travel necessities may be further formed in the top rear side of the vertical wall 801.

Accordingly, burdens can be loaded in a storage space formed in the front top of the cabin-like body frame 110, thereby securing a wider seat space in the interior of the cabin-like body frame 110.

In addition, preferably, a foldable table 115 which is placed in the upper side of the seat board 111 in the rear side of the vertical wall 801 and is foldably connected to the rear side of the vertical wall 801 may be further included.

Accordingly, a passenger sitting on the seat board 111 can unfold the foldable table 115 for comfortable meal or reading.

Figure 5:
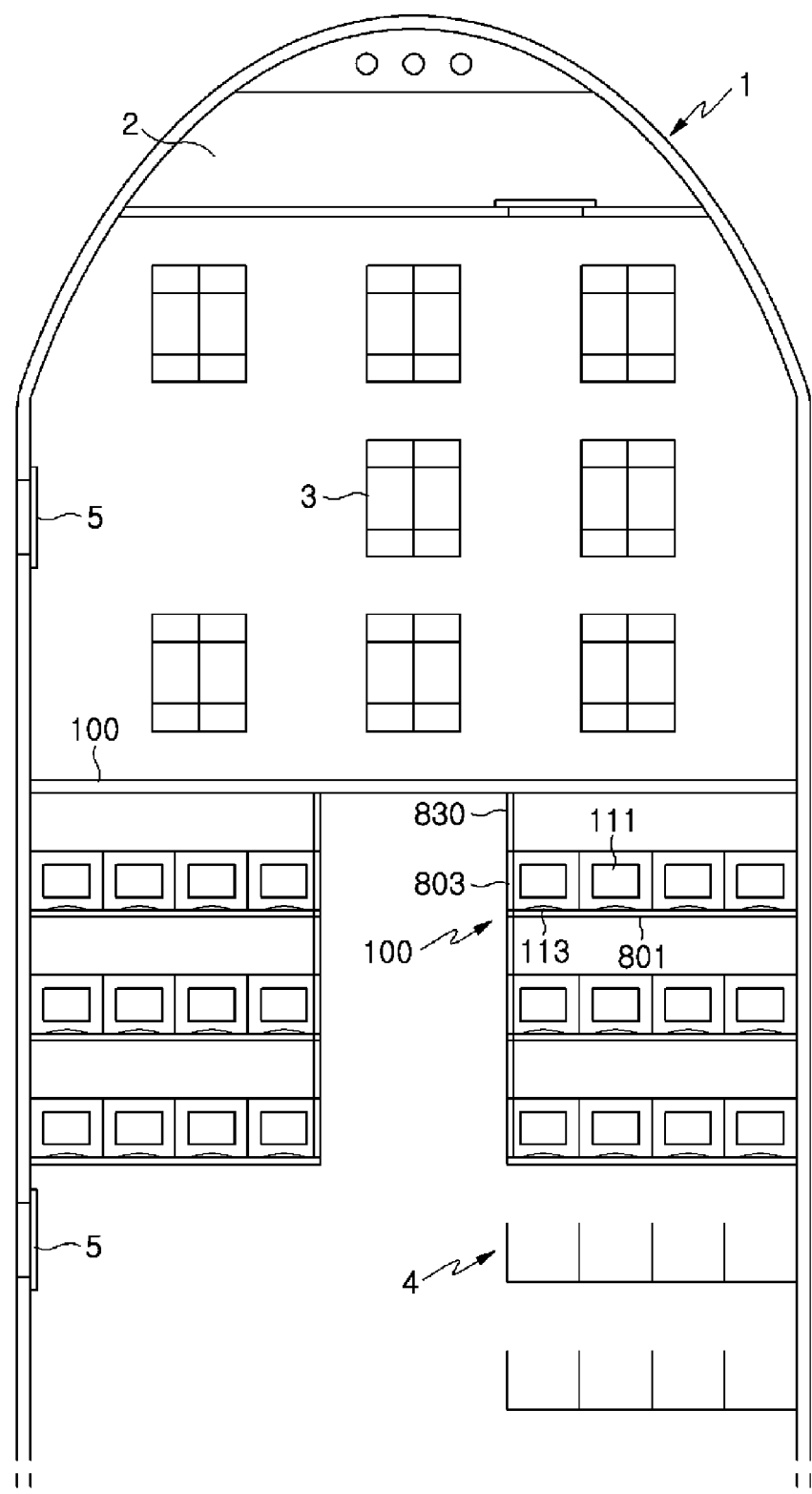
FIG. 5 is a plan view showing arrangement of the airplane seat structure of the present invention.
Figure 6:
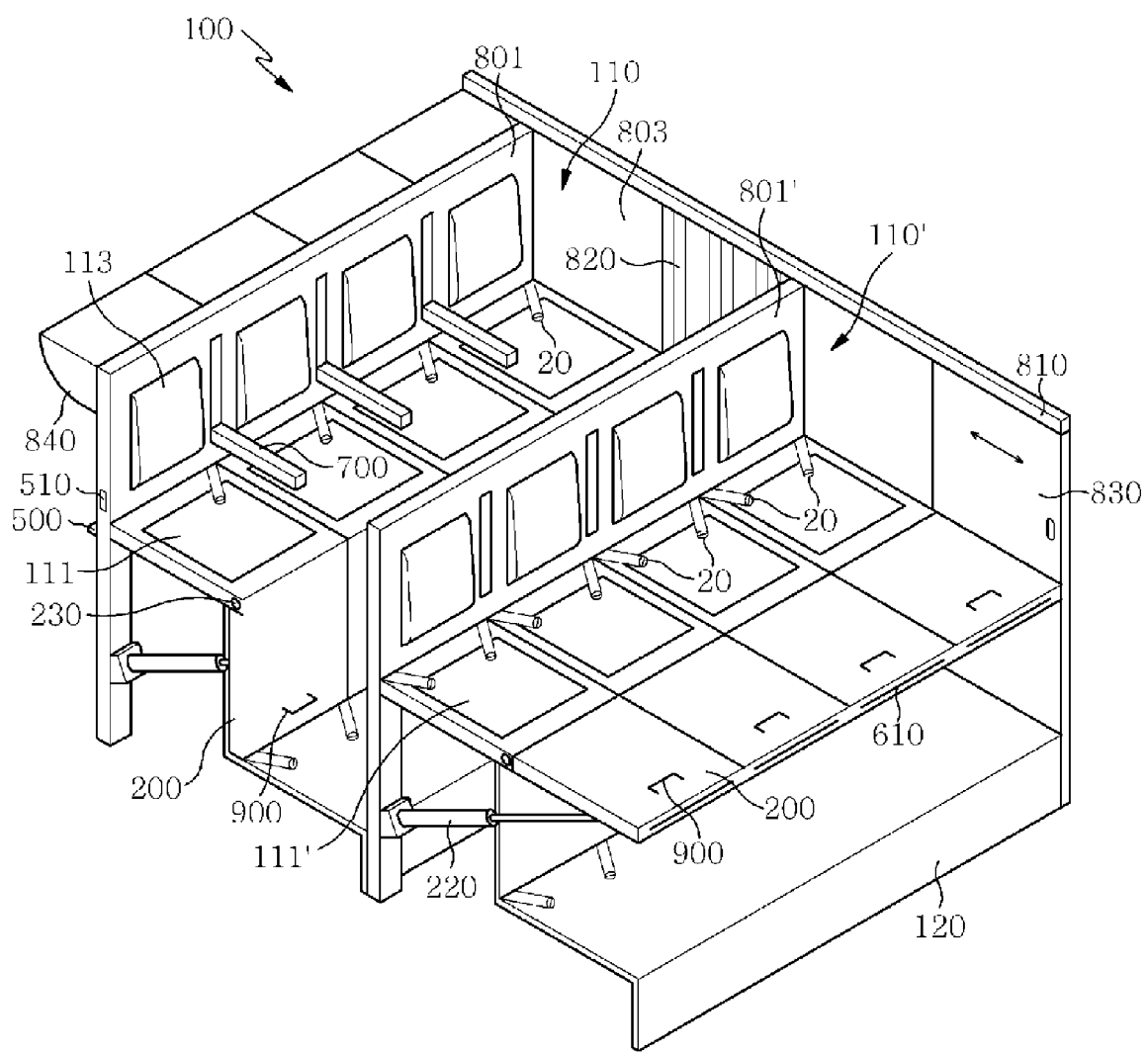
FIG. 6 is a view showing another embodiment of the airplane seat structure of the present invention.
Figure 7:
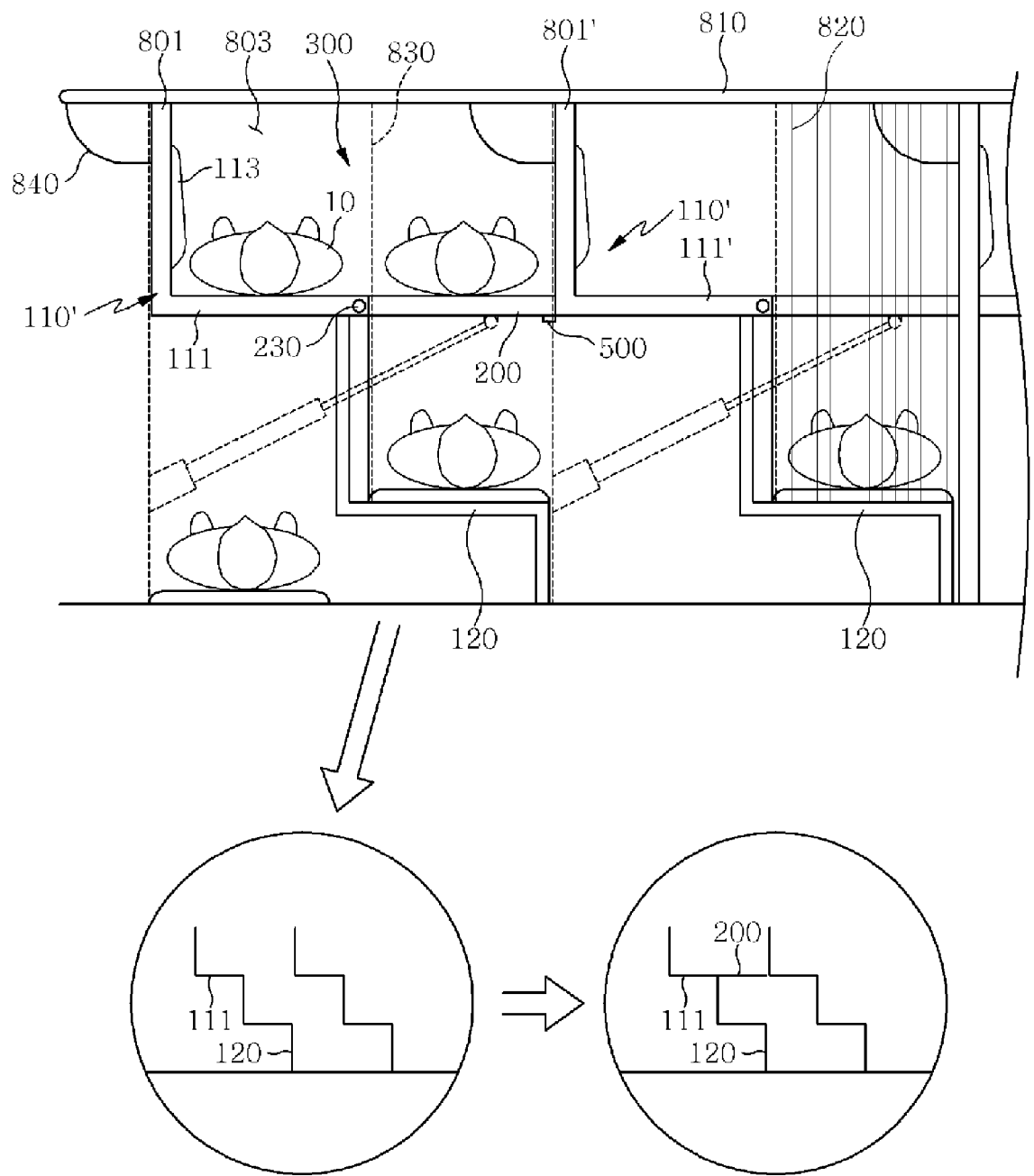
FIG. 7 is a view showing another embodiment of the airplane seat structure of the present invention.
Figure 8:
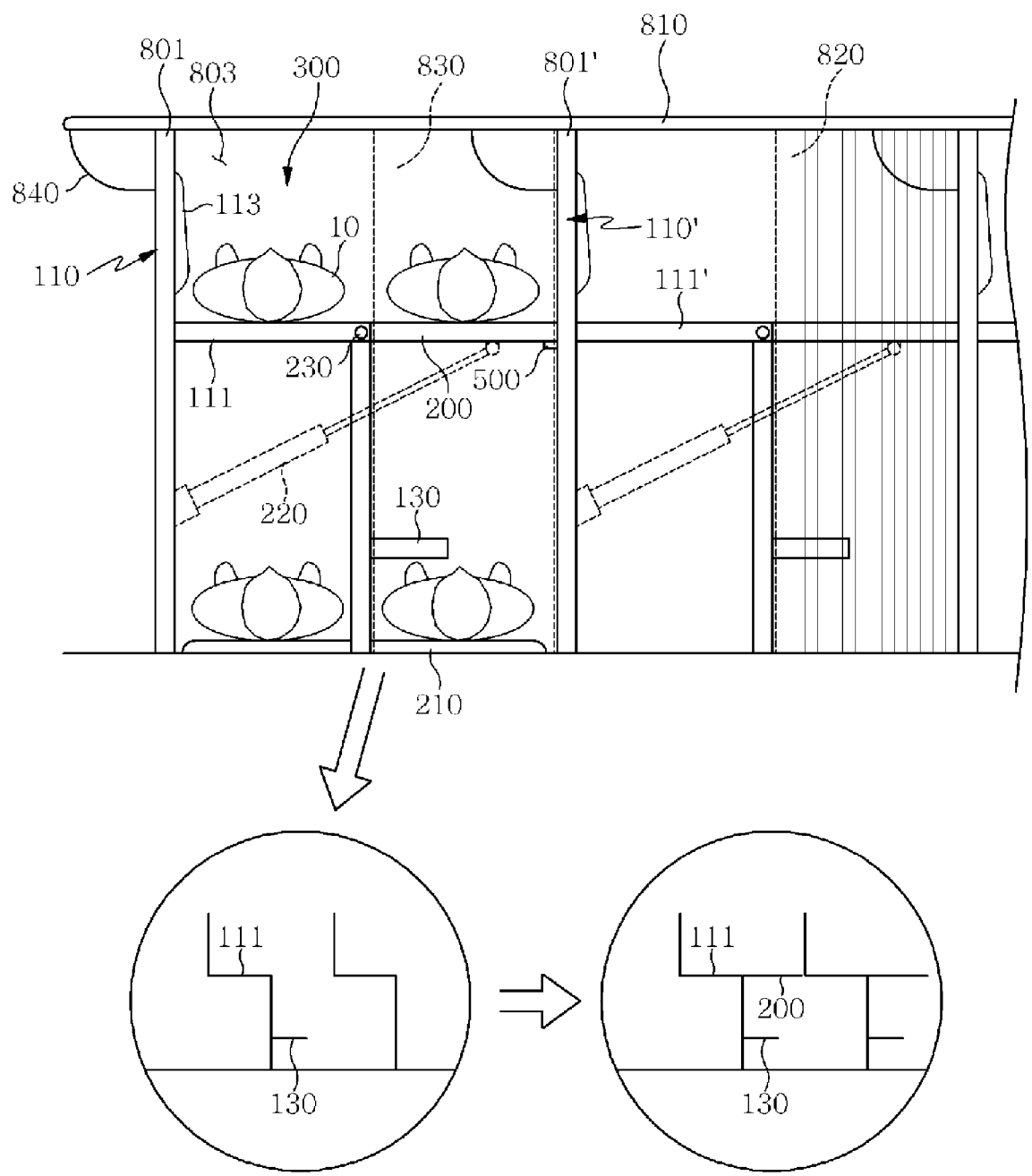
FIG. 8 is a view showing details of the embodiment of the airplane seat structure shown in FIG. 7.
Figure 9:
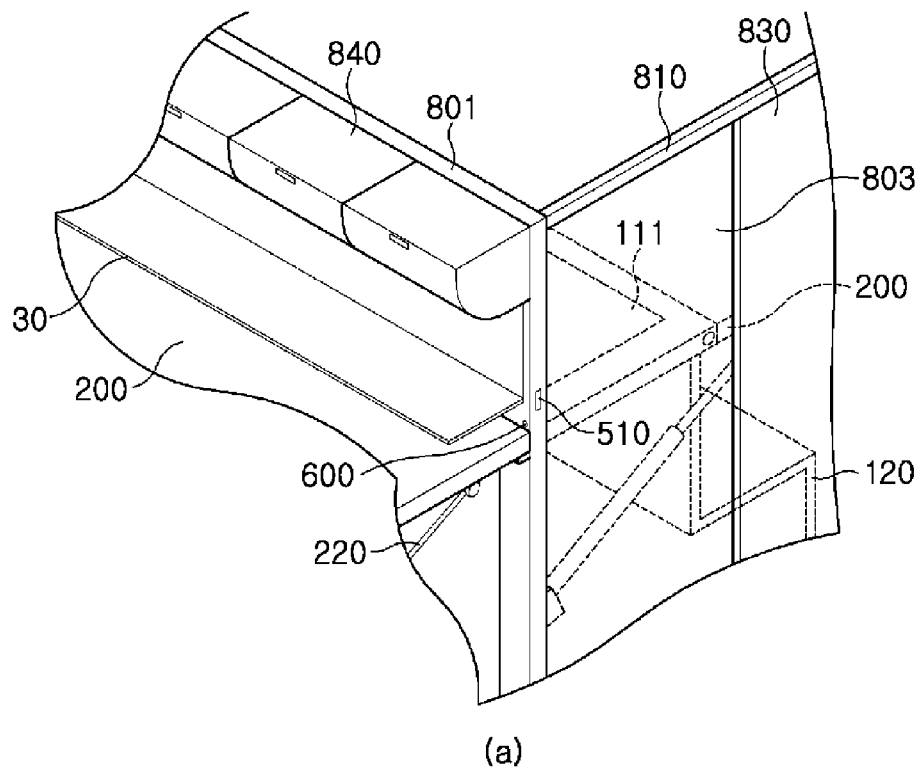
FIG. 9 is a view showing another embodiment of the airplane seat structure of the present invention.
Figure 9:
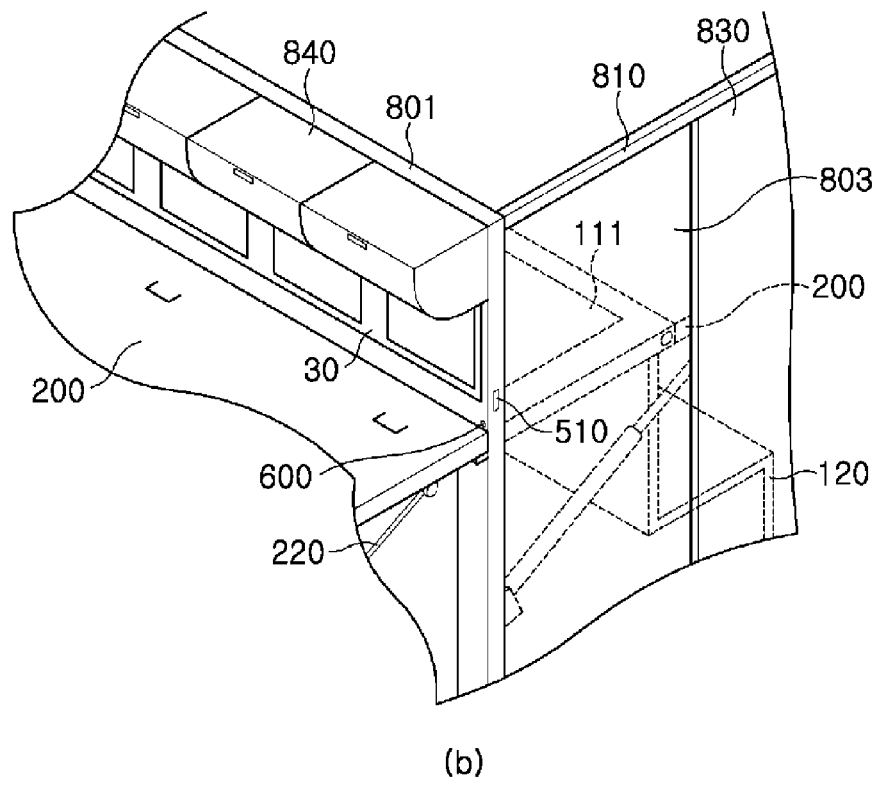

The above-described cabin type family box is separately prepared in a space separated from a first class 3 and an economy class 4 in an airplane and provides a family group class incurring a differentiated fee, as shown in FIG. 5.

Accordingly, a single family can be assigned a family box which is partitioned by one cabin-like body frame 110 and provides a separate space where family members can lie.

Unmentioned reference numerals 2 and 5 denote a cockpit and a doorway, respectively.

FIGS. 6 to 9 show another embodiment in which a step structure with increased seat height is employed.

As shown, a step 120 and a step plate 130 on which feet can be comfortably put may be further provided in a frame between a seat board and the seat floor.

In this case, the connection plate 200 may or not be present and the step structure may be altered in various forms. For example, the connection plate 200 may not be present but the step 120 may be provided between seat floors, as indicated by a circle shown in the lower left portion in FIG. 7, the connection plate 200 may be provided between the step 120 and the seat board 111, as indicated by a circle shown in the lower right portion in FIG. 7, the connection plate 200 may not be present but the step plate 130 may be provided between the seat board 111 and the seat floor, as indicated by a circle shown in the lower left portion in FIG. 8, and the connection plate 200 may be provided between the step plate 130 and the seat board 110, as indicated by a circle shown in the lower right portion in FIG. 8.

In addition, a safety belt 20 may be provided in the rear end of the step 120 and the step plate 130.

In addition, a foldable bed 30 for rest and sleep may be provided in the rear side of the body frame. This foldable bed 30 may be attached to the body frame at ordinary times.

In addition, storage 840 for storing travel necessities may be further formed in the top rear side of the vertical wall 801.

Burdens can be loaded in a storage space formed in the front top of the body frame, thereby securing a wider seat space in the interior of the body frame.

In this case, refrigeration capability for beverages and drinking water may be added to the storage 840.

Figure 10:
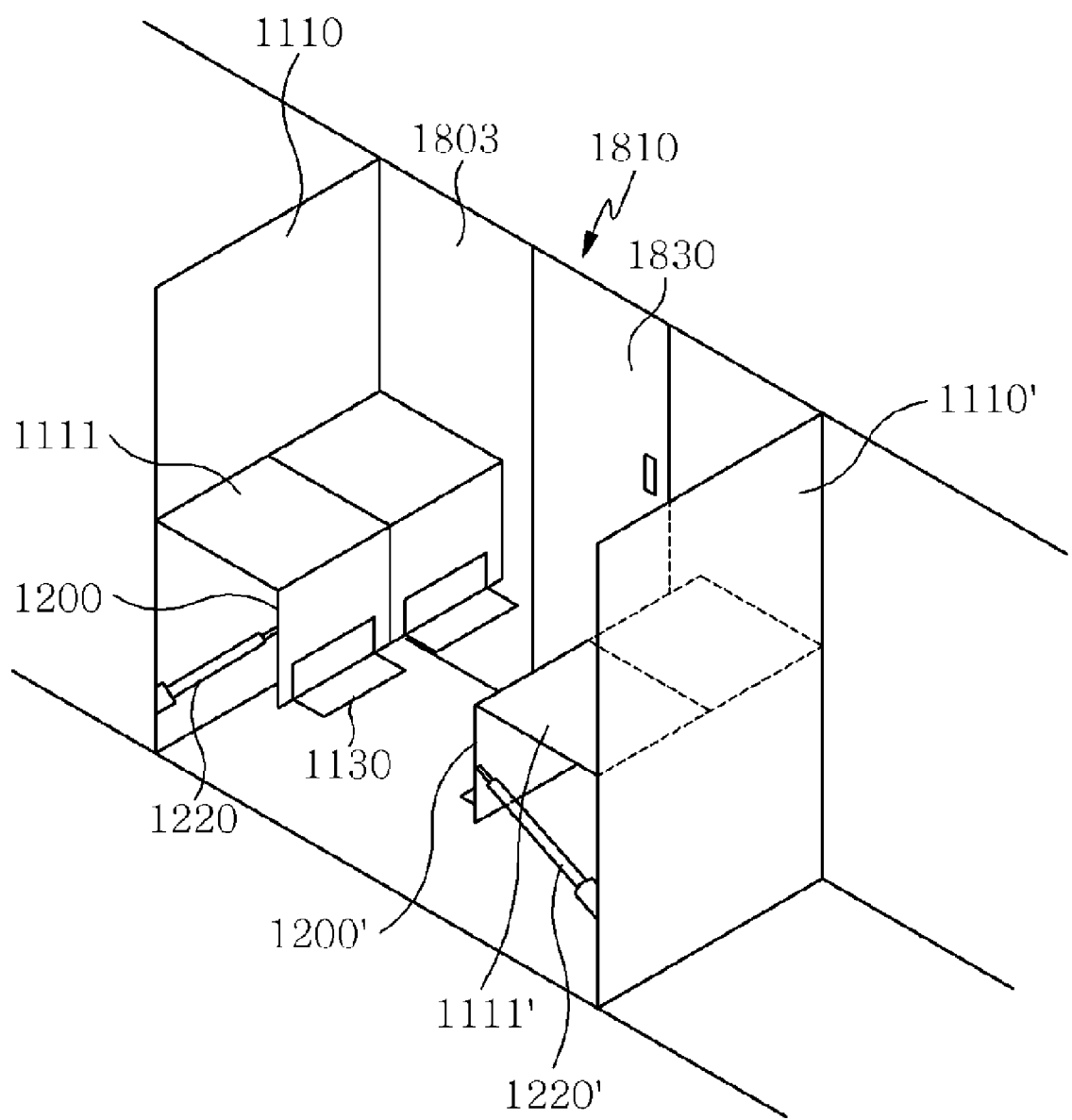
FIG. 10 is a view showing a separate space of the airplane seat structure of the present invention.
Figure 11:
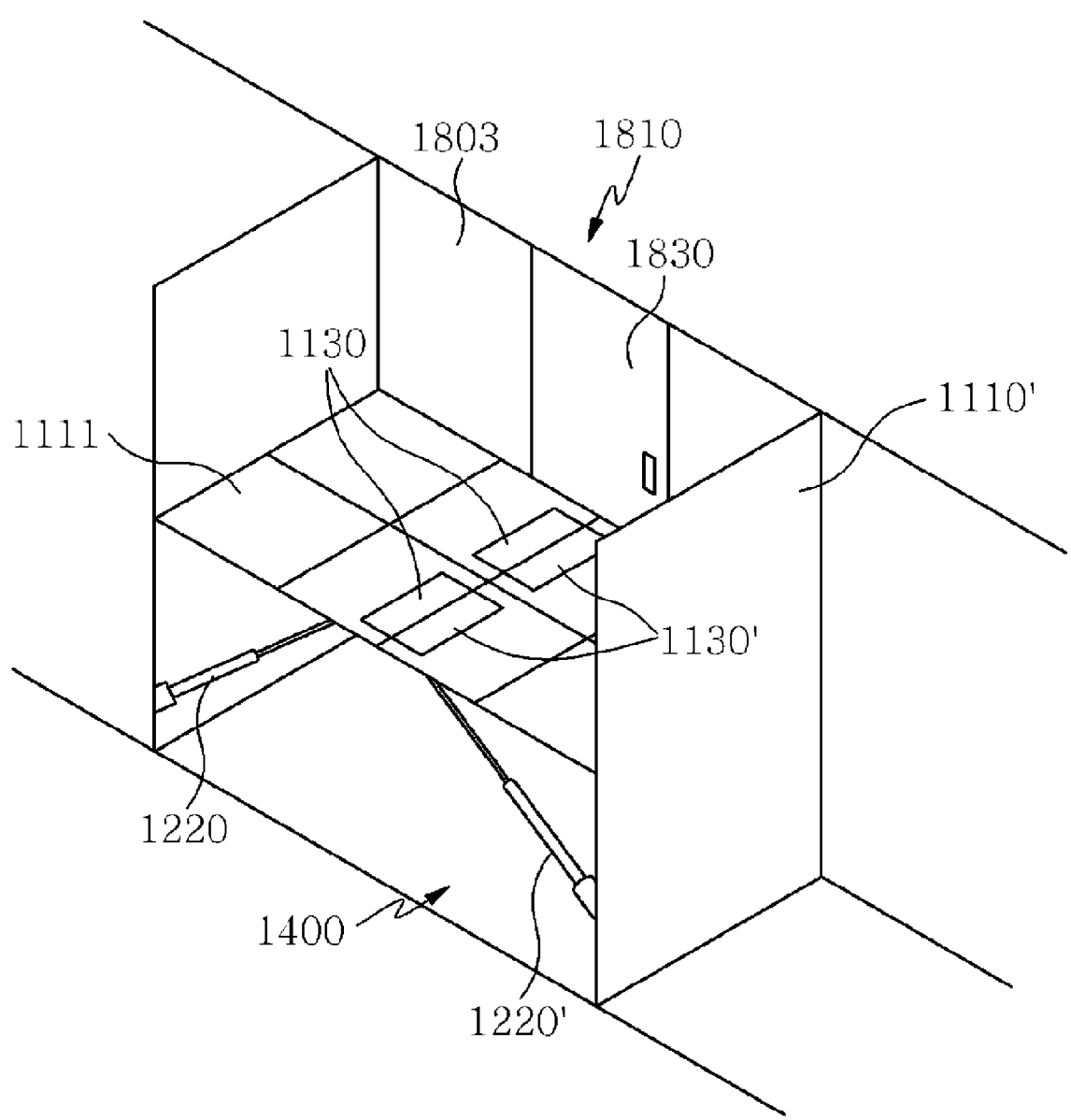
FIG. 11 is a view showing details of the embodiment of the airplane seat structure shown in FIG. 10.
Figure 12:
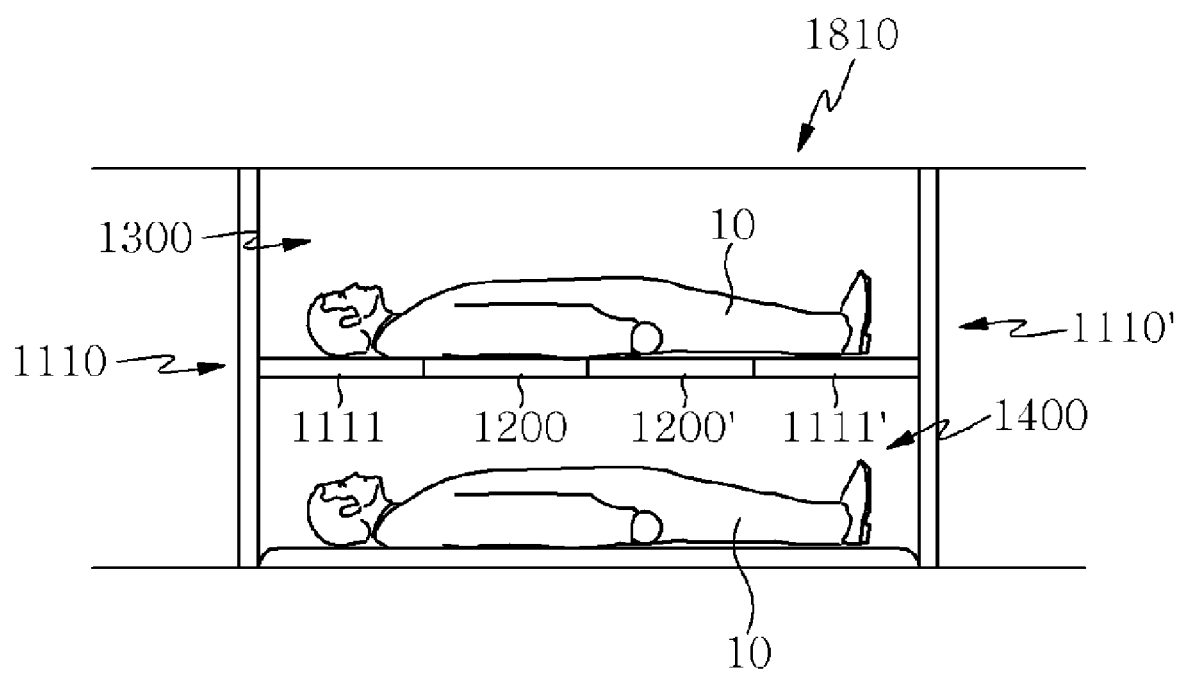
FIG. 12 is a view showing details of the embodiment of the airplane seat structure shown in FIG. 11.

FIGS. 10 to 12 show another embodiment in which seats face with each other and a single separate space is provided.

As shown, this seat structure includes connection plates 1200 and 1200', a first bed space 1300 which is formed over a seat board 1111 and the horizontally-spread connection plates 1200 and 1200', and a second bed space 1400 which is formed below the seat board 1111 and the horizontally-spread connection plates 1200 and 1200' or formed below the horizontally-spread connection plates 1200 and 1200' and a seat board 1111' of the frontward adjacent body frame 1110'.

The number of seats provided by the seat boards 1111 corresponds to the number of persons who can be lay, provided by the first bed space 1300 and the second bed space 1400.

In addition, a guide frame 1810 connecting tops between the body frame 1110 and another frontward facing body frame 1110', and a cloth or a sliding door 1830 which is moved along the guide frame 1810 and blocks between a blind wall 1803 and the frontward facing cabin-like body frame 1110' may be further included.

In this case, a fixable sliding door 1830 instead of a cloth is more preferable such that the interior of the body frames 1110 and 1110' can provide a separate comfortable seat board space for family.

If needed, a foldable table may be additionally configured within the blind wall 1803.

In addition, foot rests 1130 and 1130' may be further included, which are folded to the connection plates 1200 and 1200' with their distal ends bendably connected to the connection plates 1200 and 1200' or are spread vertically or substantially vertically from the connection plates 1200 and 1200'.

That is, a passenger whose foot does not touch the floor can take a comfortable posture by putting the foot on the spread foot rests 1130 and 1130'.

In addition, preferably, hydraulic cylinders 1220 and 1220' or an electric-driven device (not shown) and a bending device (not shown) may be further included, which actuate the connection plates 1200 and 1200' to be horizontally spread or bent downward and may be covered to prevent a scratch in use.

Figure 13:
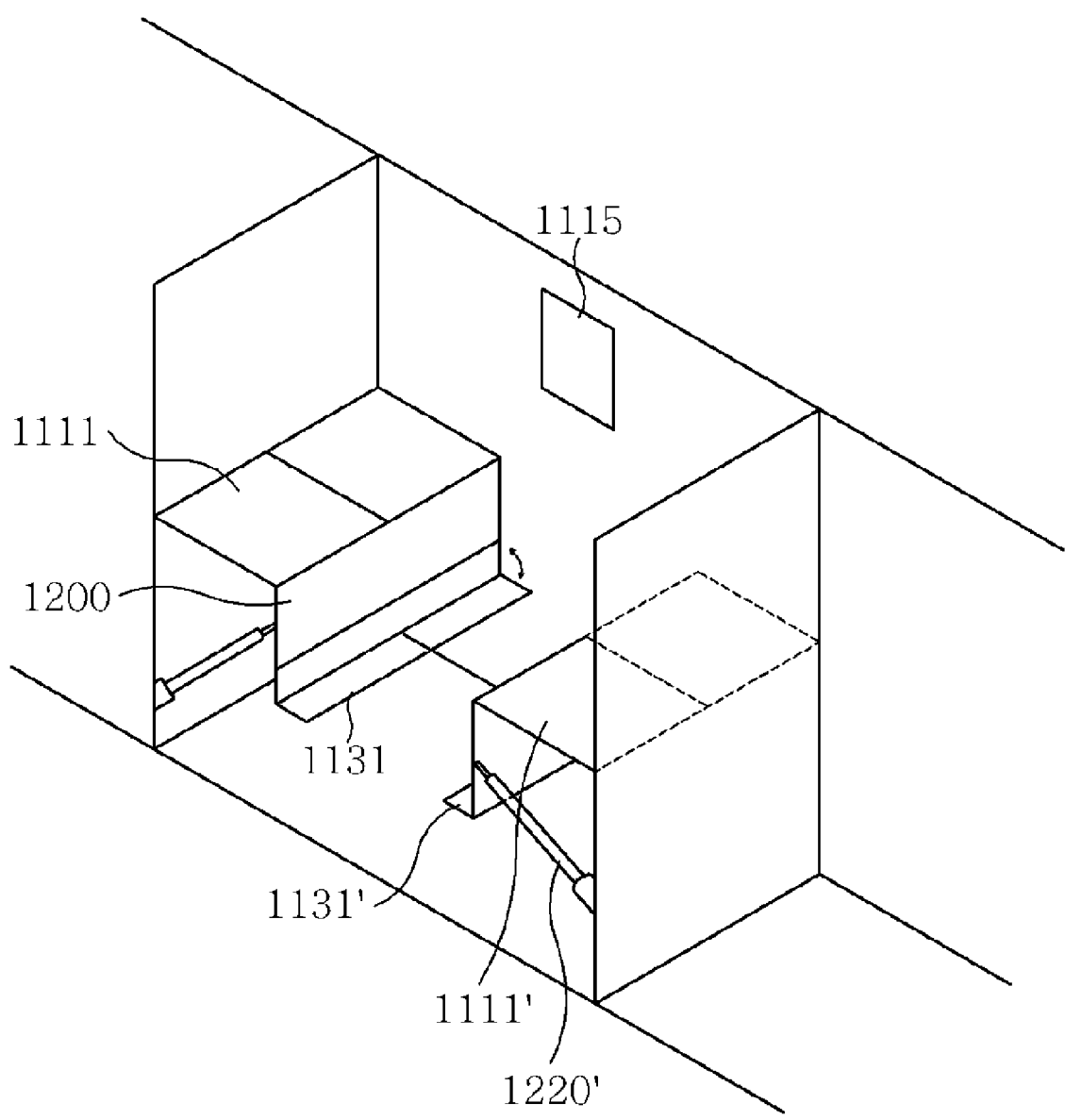
FIG. 13 is a view showing another embodiment of the airplane seat structure of the present invention.

FIG. 13 shows another embodiment in which the foot rest structure is more or less modified.

It is shown in this figure that the structure of the foot rests 1130 and 1130 shown in FIGS. 10 to 12 is more or less modified to provide a more stable footplate.

The corresponding foot rests 1131 and 1131' may be folded when the connection plates 1200 and 1200' are ascended.

The structure shown in FIG. 13 shows a wall in the opposite side to those shown in FIGS. 10 to 12, on which a foldable table 1115 may be formed as shown.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. An airplane seat structure comprising:
    a body frame including a plurality of seat boards and seat backs which are arranged in the longitudinal direction at predetermined intervals in a space having a small seat pitch and provide two or more seats in the traverse direction;
    a connection plate which is bendably connected to a front end of the body frame or the seat board and is horizontally spread to another body frame adjacent frontward to the body frame;
    a first bed space which is formed over the seat board and the horizontally-spread connection plate; and
    a second bed space which is formed below the seat board and the horizontally-spread connection plate or formed below the horizontally-spread connection plate and a seat board of the frontward adjacent body frame,
    wherein the number of seats provided by the seat boards corresponds to the number of persons who can be laid, provided by the first bed space and the second bed space, and
    wherein the connection plate is bendably connected to each of front ends of the seat boards.

2. The airplane seat structure according to claim 1, wherein the body frame is in the form of a cabin including a vertical wall which is vertically formed in a rear end of the seat board and includes the seat back, and a blind wall which is vertically formed adjacent to the vertical wall in both ends of the seat board.

3. The airplane seat structure according to claim 1, wherein the connection plate is bendably integrated with the front end of the body frame with no distinction between the seat boards.

4. The airplane seat structure according to claim 1, further comprising an arm rest which is disposed to correspond to both sides of the seat board in the traverse direction, is bendably connected to the seat back, and extends horizontally to the front side of the seat back or is withdrawn into the seat back.

5. The airplane seat structure according to claim 1, further comprising a hydraulic cylinder or a bending device which actuates the connection plate to be horizontally spread or bent downward.

6. The airplane seat structure according to claim 1, further comprising a connection plate braking sensor which is mounted on a distal end of the connection plate, detects an emergency situation such as a finger being caught between the distal end of the connection plate and the adjacent body frame when the connection plate is horizontally spread, and stops the spreading operation of the connection plate or bends the connection plate downward.

7. The airplane seat structure according to claim 1, further comprising a connection plate safety device for fixing the distal end of the horizontally spread connection plate to the frontward adjacent body frame, and a safety device switch for actuating the connection plate safety device.

8. The airplane seat structure according to claim 1, further comprising:
    a regular position sensor for detecting a regular position of the distal end of the horizontally spread connection plate connected to the frontward adjacent body frame; and
    an alarm for alerting any detected separation from the regular position.

9. The airplane seat structure according to claim 1, further comprising an emergency beeper included in the interior of the second bed space for alarming an emergent situation.

10. The airplane seat structure according to claim 1, further comprising a foot rest which is folded to the connection plate with its distal end bendably connected to the connection plate or is spread vertically or substantially vertically from the connection plate.

11. The airplane seat structure according to claim 2, further comprising a guide frame connecting the blind wall and the top of the frontward adjacent body frame, and a cloth or a sliding door which is moved along the guide frame and blocks between the blind wall and the frontward adjacent body frame.

12. The airplane seat structure according to claim 2, further comprising storage formed in the top rear side of the vertical wall for storing travel necessities.

13. The airplane seat structure according to claim 2, further comprising a foldable table which is placed in the upper side of the seat board in the rear side of the vertical wall and is foldably connected to the rear side of the vertical wall.

14. The airplane seat structure according to claim 1, wherein the seat board includes a step plate formed in the direction from the seat board to the seat floor.

15. The airplane seat structure according to claim 1, further comprising a safety belt with the connection plate excluded from the airplane seat structure.

16. The airplane seat structure according to claim 1, wherein the body frame is provided with a foldable bed.

17. An airplane seat structure comprising:
- a pair of body frames, each including a plurality of seat boards and seat backs which are arranged in the longitudinal direction at predetermined intervals in a space having a small seat pitch and provide two or more seats in the traverse direction;
- a connection plate which is bendably connected to a front end of one of the body frames or the seat board and is horizontally spread to the other opposing body frame;
- a first bed space which is formed over the seat board and the horizontally-spread connection plate; and
- a second bed space which is formed below the seat board and the horizontally-spread connection plate,
- wherein the number of seats provided by the seat boards corresponds to the number of persons who can be laid, provided by the first bed space and the second bed space, and
- wherein the connection plate is bendably connected to each of front ends of the seats boards.

18. The airplane seat structure according to claim 17, further comprising blind plates connecting the pair of body frames and a sliding door which is formed between the blind plates.

19. The airplane seat structure according to claim 17, wherein a foot rest on which feet can be put is further included in a lower part of the connection plate.

* * * * *